United States Patent
Chiu et al.

(10) Patent No.: US 7,820,081 B2
(45) Date of Patent: *Oct. 26, 2010

(54) METHOD FOR POST-INJECTION LAMINATION TO ADD A FUNCTIONAL FILM TO AN OPTICAL LENS

(75) Inventors: Hao-Wen Chiu, Palm Harbor, FL (US); Matthew James Lockwood, Bradenton, FL (US)

(73) Assignee: Essilor International (Compagnie Generale d'Optique), Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/120,628

(22) Filed: May 14, 2008

(65) Prior Publication Data

US 2009/0283926 A1 Nov. 19, 2009

(51) Int. Cl.
*B29D 11/00* (2006.01)
*G02B 3/00* (2006.01)
*G02B 5/30* (2006.01)
*G02B 5/32* (2006.01)

(52) U.S. Cl. ............... 264/1.7; 264/1.32; 264/2.7; 264/1.31

(58) Field of Classification Search ............ 264/17, 264/1.7, 1.32, 2.7, 1.31
See application file for complete search history.

(56) References Cited

U.S. PATENT DOCUMENTS

| | | | | |
|---|---|---|---|---|
| 5,244,775 A | * | 9/1993 | Miwa et al. | 430/321 |
| 5,757,459 A | * | 5/1998 | Bhalakia et al. | 351/168 |
| 5,827,614 A | | 10/1998 | Bhalakia et al. | |
| 6,180,043 B1 | * | 1/2001 | Yonemochi et al. | 264/255 |
| 6,228,289 B1 | * | 5/2001 | Powers et al. | 264/1.36 |
| 6,328,446 B1 | | 12/2001 | Bhalakia et al. | |
| 6,353,079 B1 | * | 3/2002 | Walker et al. | 528/87 |
| 6,659,608 B2 | | 12/2003 | Yamamoto et al. | |
| 6,814,896 B2 | | 11/2004 | Bhalakia et al. | |
| 2001/0000961 A1 | * | 5/2001 | Hikida et al. | 345/173 |
| 2004/0047056 A1 | * | 3/2004 | Sekiguchi et al. | 359/883 |
| 2006/0219347 A1 | * | 10/2006 | Begon et al. | 156/99 |
| 2007/0034321 A1 | * | 2/2007 | Glacet et al. | 156/230 |
| 2007/0138665 A1 | | 6/2007 | Chen et al. | |
| 2007/0138667 A1 | | 6/2007 | Dang et al. | |
| 2008/0315162 A1 | * | 12/2008 | Berzon | 252/582 |
| 2008/0317950 A1 | | 12/2008 | Berzon et al. | |

* cited by examiner

*Primary Examiner*—Khanh Nguyen
*Assistant Examiner*—Matthew Hoover
(74) *Attorney, Agent, or Firm*—Keusey & Associates, P.C.

(57) ABSTRACT

A method for laminating a functional film on to a thermoplastic injection molded lens. A thermally curable glue is deposited on the lens while it is still in the mold. A functional film is introduced and the mold is closed again. The heat from the mold and the clamping pressure thermoform the film and cure the glue, in a lamination process. A functionally enhanced lens having a film intimately laminated on to one side.

21 Claims, 2 Drawing Sheets

METHOD FOR POST-INJECTION LAMINATION TO ADD A FUNCTIONAL FILM TO AN OPTICAL LENS

BACKGROUND OF THE INVENTION

1. Field of the Invention

The invention relates to laminating a functional film onto an injection molded ophthalmic lens using the clamp pressure, mold temperature, and residual resin heat to cure a thermally curable glue, preferably an acrylate based glue, to facilitate the bonding between the film and the lens.

2. The Prior Art

In the manufacture of plastic lenses, the injection molded lens is removed from the mold for further processing to integrate specific functions such as anti-reflective, photochromic, or anti-scratch to the lens. Typically the lenses are cleaned and dip-coated with a tint coating, photochromic coating, anti-reflective coating, hard coating or other protective coating layers. The cleaning and dip-coating process requires a large investment of space, resources and energy.

Other approaches involve laminating a single or multi-layer functional film onto the lens. One technique known as film insert molding (FIM) places the film into the empty cavity of the injection molding machine. The molten resin is then injection molded into the cavity so that the high temperature melts the facing layer of the film, causing it to fuse to the subsequently solidified lens. By way of example, this technique is described in U.S. Pat. No. 5,827,614, U.S. Pat. No. 6,328,446, U.S. Pat. No. 6,814,896 and U.S. Pat. No. 6,659,608. A serious drawback of FIM, is the requirement that the facing layer of the film be the same or compatible with the lens resin, to obtain a fusion between the material of the facing layer of the film and the injected resin.

Another drawback of FIM, is related to the high temperature required to obtain melted resin which could degrade or partially destroy the functionality built into the film.

Accordingly, it would be desirable to provide a process for adding functional layers to a lens which has a greater degree of flexibility, and which maintains at a high level of quality the integrity of the film's functionality.

SUMMARY OF THE INVENTION

It is an object of the present invention to provide an in-mold lamination system that easily combines a functional film with a lens.

It is a further object of the present invention to utilize the clamp force of an injection molding machine to mechanically press a functional film onto an injection molded lens.

It is another object to take advantage of the mold temperature and the residual heat of a just molded lens, to drive the curing process of a thermally curable, preferably acrylate-based, glue, to obtain adhesion between a functional film and a lens and to provide a functionalized thermoplastic laminated lens.

It is an additional object to broaden the range of film materials that can laminated.

These and other related objects according to the invention are achieved by an embodiment of the invention which provides a method for laminating a functional film onto an injection molded thermoplastic lens that resides in an injection molding machine. Another embodiment of the invention involves a thermoplastic ophthalmic lens having a functional film laminated on to one side.

In a first step of the method, molten thermoplastic resin is injected into a lens-forming cavity held closed under a primary clamp force. The mold is opened at a time when the lens is rigid enough to retain its shape and separate from one of the inserts. An unpressurized full metered charge of curable glue is deposited onto the center of the lens. Next a functional film is introduced between the glue and the separated insert. The mold is then closed to a secondary clamp force less than or equal to the primary clamp force to thinly spread the glue between the film and lens so that it cures with the heat transferred from the mold and the diminishing residual heat of the lens.

The thermoplastic resin is injected at a melt temperature $T_m$ that is significantly above its glass transition $T_g$ temperature, and the lens forming cavity is at a temperature lower than $T_g$ to facilitate solidification. The $T_m$ is in the range of 500 degrees F. to 600 degrees F. and the mold temperature is in the range of 200 degrees F. to 295 degrees F. when the lens forming resin is polycarbonate.

The curable glue comprises an acrylate-based adhesive which is curable at a temperature between $T_m$ and the mold temperature. The depositing step comprises applying a liquid glue in an open-air state; and wherein during the closing step the glue is spread in the absence back pressure. The curable glue is VOC-free, and compatible with the lens resin and film material to cure optically clear and avoid visible interference fringes. The curable glue provides an adhesive layer to optically bond an outer film surface to an outer lens surface at a temperature well below the $T_m$ of the injecting thermoplastic resin. The glue includes one or more (meth)acrylate compounds, an initiator, and a metal salt. Preferentially, the glue comprises a monofunctional (meth)acrylate compound, a multifunctional (meth)acrylate compound, a difunctional (meth)acrylate compound, and an aliphatic urethane diacrylate. The preferred, metal salt is Cobalt naphthenate, and the preferred initiator is tert-butylperoxybenzoate. A photochromic dye may be blended into the curable glue. Optionally, the glue comprises also at least one thermoplastic polyurethane (TPU), which may be an aliphatic polycarbonate-based TPU.

The closing step includes thermoforming the film to replicate the shape of the lens and any surface textures on the insert. The functional film is selected from the group consisting of a sandwiched polarizing filter, a photochromic film, and an anti-reflective film. The sandwiched polarizing filter comprises a polarizing filter of polyvinyl acetate (PVA) sandwiched between a protective layer made from a material selected from the group consisting of polycarbonate, cellulose triacetate (TAC), cellulose acetate butyrate (CAB) and polyethylene terephthalate (PET). The protective layer includes an additional functional feature.

The secondary clamp force is in the range from about 1% to about 100% of the primary clamp force. Following the closing step, the method further including the step of ejecting the lens from the mold after the adhesive has cured and the laminated lens is capable of withstanding ejection forces without deforming.

The thermoplastic resin is selected from polymethyl(meth) acrylate, polycarbonate, polycarbonate/polyester blends, polyamide, polyester, cyclic olefin copolymers, polyurethane, polysulfone and combinations thereof. The film and glue are well suited for use with polycarbonate. The lens-forming cavity is selected from an afocal lens forming cavity, a unifocal lens forming cavity, a bifocal lens forming cavity, a trifocal lens forming cavity, and a progressive lens forming cavity.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENT

As an overview of the method according to the invention, an optical lens is formed by the conventional manufacturing cycle of injecting molten plastic into a mold cavity that is at a temperature lower than the glass transition temperature $T_g$ of the plastic, which is about 300 degrees F. for polycarbonate. The mold is opened after the lens is sufficiently solidified to expose one lens surface. One or multiple drops of thermally curable glue are deposited onto the just exposed lens surface. The functional film is placed on top of the lens surface or loaded into the empty cavity that is facing the lens. In effect the film is introduced between the glue and the free insert surface that is spaced from the lens. The mold is closed to thermoform the film by the heat of the cooling lens and mold along with the clamp tonnage. The film conforms to the shape of the target lens surface and the glue spreads out in between the lens and the film to a thin uniformly thick layer. Finally, the mold is opened when the glue is sufficiently cured from the heat of the mold to eject the laminated lens and complete the injection lamination cycle. The injection molding machine is now ready to repeat the cycle.

According to the present invention, a functional film or a film may be a simple unilayer, or a laminated or stratified film comprising a plurality of layers having identical or different chemical characteristics and/or functionalities.

Figure 1:
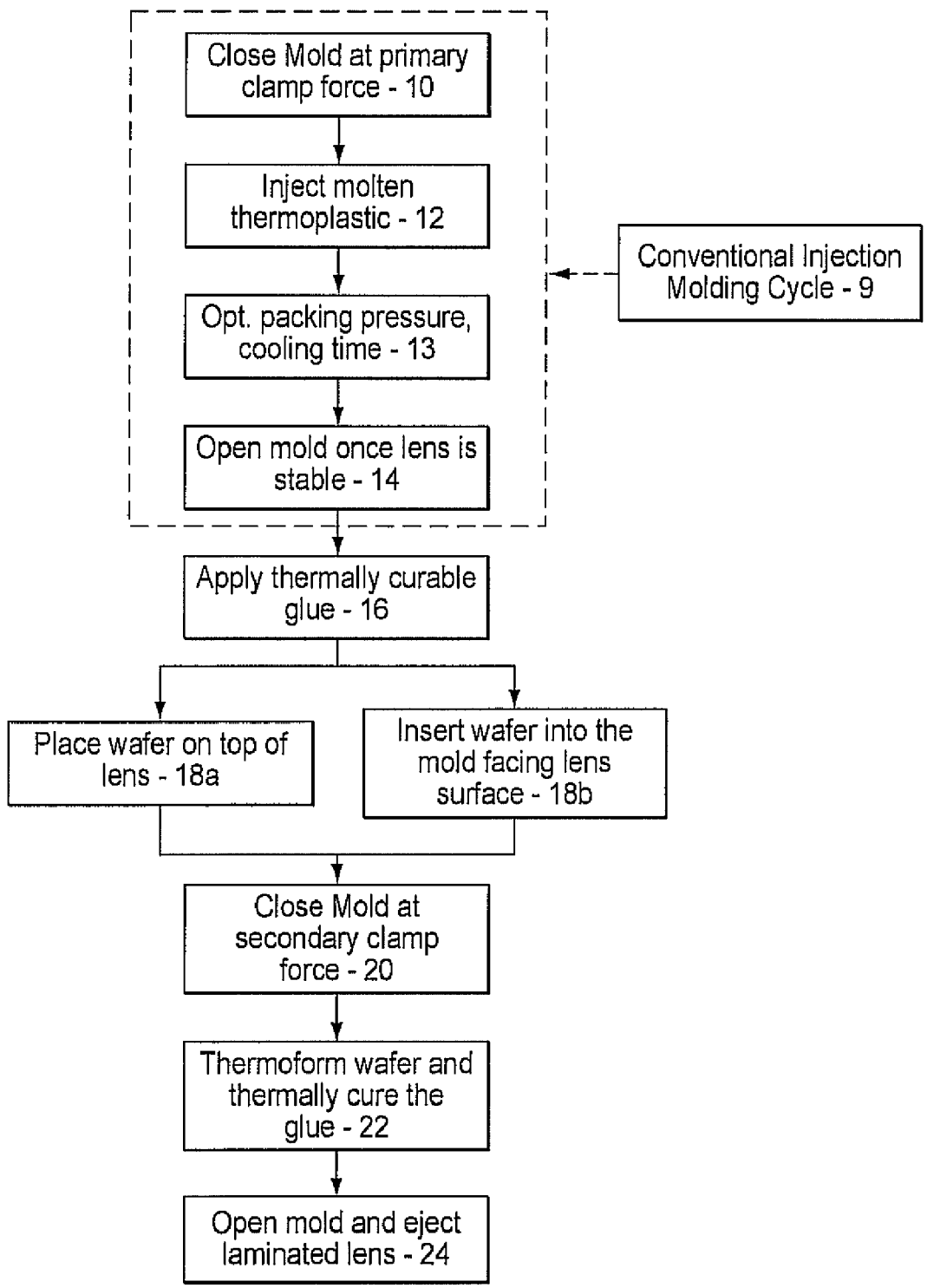
FIG. 1 is a flowchart showing various steps in the method according to an embodiment of the invention.

Referring now in detail to the Figures, and in particular FIG. 1, there is shown a flowchart showing various steps according to the inventive method. In step 10, the mold is closed at a primary clamp force to begin the injection molding cycle. The mold consists of one or more pairs of lens forming inserts which collectively define a cavity when the mold is closed. For example, for molding polycarbonate with a 4-cavity mold, the primary clamp force is typically greater than 75 tons, preferably greater than 100 tons. The thermoplastic resin is rendered molten in a screw injector barrel. When using polycarbonate, for example, the melt temperature $T_m$ may be in the range of 500 to 600 degrees F. In step 12 the molten resin is injected into the cavity. The inserts may be maintained at a temperature in the range of 200 to 295 degrees F. The cooler temperature of the inserts facilitates solidification of the molten resin as its temperature drops below its $T_g$. Optionally, a packing pressure, step 13, may be applied, where the actual pressure exerted on the thermoplastic is higher than 1,000 psi. A wait time, step 13, is imposed to insure dimensional stability, before the mold is opened in step 14. The wait time may be in the range of 30 seconds to several minutes, typically from 30 seconds to 5 minutes. The above steps 10, 12, 13 and 14 are part of a conventional injection molding cycle 9.

The lens will be retained on one side of the mold. As will be apparent from the following description, the lens may be retained either on the stationary or the movable side of the mold. In addition, the exposed lens surface may be either the convex or the concave side. In step 16, a drop or several drops of curable glue are deposited onto the exposed lens surface. The glue may be delivered in a single, unpressurized charge. At the time of glue delivery, the lens is in the process of cooling from its $T_m$ of 500-600 degrees F. (for polycarbonate, for example) down to the mold temperature of 200-300 degrees F. (for polycarbonate for example). As the glue is heated it may become less viscous.

Next the functional film is brought into the mold. Step 18*a* indicates the film is placed on top of the lens. As mentioned above, the top lens surface could be the convex or concave side of the lens. Generally, the convex side is the outside of a lens, and the concave side is the interior, i.e. facing the wearer's eye. Accordingly, our process is suitable to add a functional film to either the interior or the exterior side of an ophthalmic lens. Step 18*b* indicates the film is inserted into the empty mold cavity. Thus, in 18*a* the film is placed on the side of the mold that retains the lens, and in 18*b* the film is placed on the side of the mold that releases the lens. The lens may be retained on the stationary or movable side of the mold. In 18*b*, the film may be inserted into the empty mold cavity that contains a convex or concave insert.

In step 20 the mold is again closed at a secondary clamp force which is less than the primary clamp force used during the injection molding phase. As the mold closes, the empty mold insert presses the film down on to the glue, causing it to spread across the facing lens and film surfaces into a thin, uniformly thick layer. As the glue thins out, its surface area increases and it absorbs more heat from the cooling lens. The film is also heated from both sides, including the lens/glue side and the empty insert side. The combination of pressure and elevated temperature causes (i) the glue to begin curing, and (ii) the film to be thermoformed to replicate the lens/insert surface [step 22]. The secondary clamp force may rise to a fraction of the primary clamp force. For example, the secondary clamp force may reach between 1% and 100% of the primary clamp force. For example, if the primary is greater than 75 tons, the secondary would be between 0.75 ton and 75 tons. If the primary is greater than 100 tons, the secondary would be between 1 ton and 100 tons. The mold may be held closed at the secondary clamp force for a period designated as dwell time, for example, for less than one minute up to several minutes. In any event, the mold is held closed until the glue is sufficiently cured and the film is intimately bonded to the lens. A further requirement is mat the film will not delaminate when step 24 is executed and the mold is opened, and the laminated lens is removed. At this point the molding, thermoforming, laminating cycle is complete. The completely empty mold, is ready to be closed and begin the next cycle, starting with injection molding a thermoplastic lens. An example of the inventive method will now be described.

Example 1

Post injection in-mold lamination experiments were conducted using an Engel ES700H 150 US ton vertical injection molding machine equipped with a 2-cavity side-entry mold. Polarizing films having a PVA (polyvinyl acetate) polarizing element sandwiched between two polycarbonate (PC) sheets were laminated to polycarbonate (PC) lenses using acrylate based glue.

The experiments were conducted according to the steps mentioned above. First, two 6.50-base SFSV (semi-finished single vision) PC lenses, 76 mm in diameter and 9 mm in thickness, were injected using the following process parameters. The melt temperature $T_m$ was 510 degrees F. in the screw injector. The mold temperature was 260 degrees F. The shot size was 2.50 inches, and the injection speed was 0.1 inch/s. The packing pressure had a machine specific reading of 800 psi, which was estimated to deliver an actual packing pressure of 9,000 psi onto the molten resin. The cooling time was 4 minutes.

At the end of cooling, the mold was opened to expose the convex surfaces of the molded lenses. One drop (0.1 ml to 1 ml, and preferably between 0.2 ml and 0.5 ml) of the acrylate based glue was then dispensed onto each lens using a syringe (the drop is preferentially dispensed in the center of the lens).

Subsequently, a 1 mm thick 5.50-base PC/PVA/PC polarizing film was placed on top of each lens. The mold was then closed to thermoform the film to the same base curve as the SFSV lens and to cure the glue. After 2 minutes, the mold was reopened to eject the lens laminates. The resulting lens laminate not only had a very strong bonding between the polarizing film and the PC lens but also exhibited very good polarization.

The front curve (CX) of the lens laminates obtained from present example was shown to be 6.50-base, which was the same as the SFSV lenses without the film. The lens laminates were then surfaced and edged to become plano polarized lenses, 2.00 mm in thickness and 60 mm in diameter. No de-lamination of the film was observed. The polarization efficiency of the resulting polarized lenses was about 99.7% and the average transmission is about 10%.

In related tests, using similar conditions, the 5.5-base films were laminated to 5.5-base 2.25-add Varilux® Comfort® lenses with good adhesion, polarization efficiency and transmission results. In another related test using similar conditions as mentioned above except the mold temperature was 285 degrees F., 4.50-base films were laminated to 1.75-base 3.50-add Essilor® Ovation® lenses with the same acrylate based glue. The resulting lenses had very good adhesion and the engravings on the insert surface were replicated clearly. The tests establish that the lens and mold contain sufficient residual heat to thermoform the film to different lens-base curves. For example, a 5.5-base film having a thickness on the order of 1 mm, can be thermoformed to different bases varying by plus 2 or minus 2, to include bases from 3.50 to 7.50. Thus a manufacturer can use one film sku for many different lenses, including lenses with different base curves, different lens types and different lens materials.

In comparison to film insert molding (FIM), the post-injection press lamination process according to the invention has many advantages. First, the material(s) of a functional film need not to be the same as, or compatible with, the lens forming resin, because no fusion is required to obtain permanent contact between the lens and the film. The FIM process injects molten plastic against the surface of a film to create a fused bonding between the lens and the film. If the surface layer of a film is not the same material as the lens forming resin or is not compatible with the resin, the resulting lens laminate either will have a poor adhesion between the film and the lens or the lens/film interface will be cloudy, non transparent. On the other hand, the present invention utilizes thermally curable glues or adhesives to facilitate the bonding of a film to the lens. With a proper choice of glues or adhesives, a clear and strongly bonded film/lens interface can be obtained even the film material is different from the lens forming resin. Hence, when making polarizing polycarbonate (PC) lens laminates, one can use many types of polarizing films such polyvinyl alcohol (PVA) polarizing film sandwiched between polycarbonate, known as PC/PVA/PC, or sandwiched between cellulose triacetate (TAC), known as TAC/PVA/TAC.

Second, the lamination of a functional film to a lens is being conducted after the lens is cooled. In this case, the highest temperature a film would experience is the temperature of the mold, which is much lower than the molten plastic temperature of the FIM process. Hence, again, present invention is compatible with more film types. For example, in general, one cannot use, PVA sandwiched between cellulose acetate butyrate (CAB), known as a CAB/PVA/CAB film when making a polarizing PC lens laminate by FIM. This is because the CAB would not protect the PVA from the high temperature of PC melt, typically in the 500 to 600° F. range, and the polarization film would be damaged. Yet, a CAB/PVA/CAB film would be fine with present invention because the mold temperature for injection-molding PC lenses is typical around 250° F. or less. In other words, FIM requires that the film facing layer must be fusible in a temperature range that overlaps with the melt temperature of the resin.

Third, since present invention disperses a layer of glue in between the film and the lens, additional functions can be added to the lens laminate through this glue layer. For example, during the fabrication of a polarizing PC lens laminate, one can use glue with photochromic dyes to create a polarizing photochromic lens. Or one can simply laminate a clear film with anti-reflective (AR) coating to a lens using photochromic glue to create an AR photochromic lens.

Figure 2:
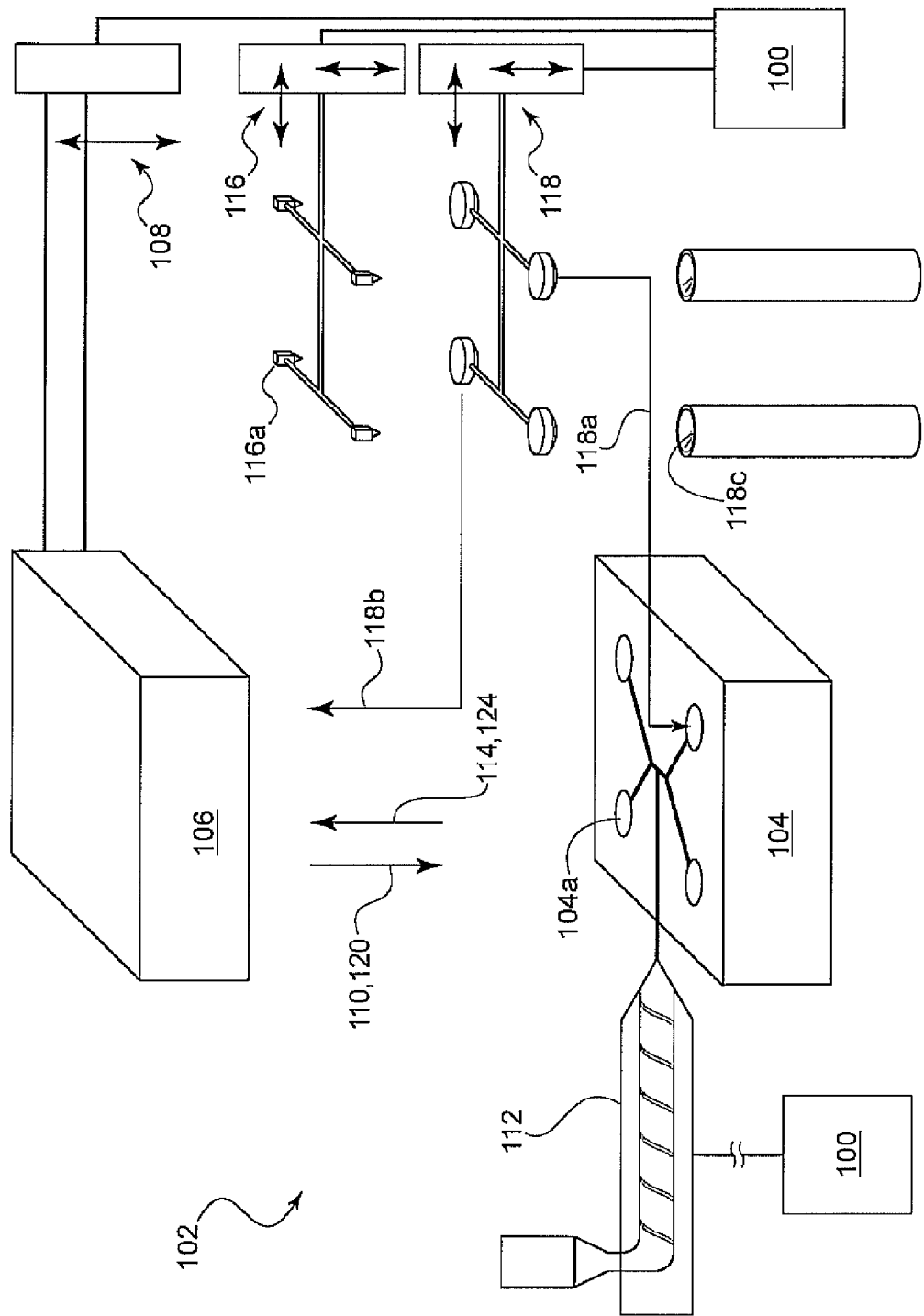
FIG. 2 is a schematic diagram illustrating an equipment layout for carrying out the method according to an embodiment of the invention.

FIG. 2 is a schematic diagram of an exemplary hardware configuration that may be used to practice the laminating method according to the invention. A system controller 100 is configured to coordinate and time the events and processes relating to injection molding machine 102, which includes a stationary mold half 104 and a movable mold half 106. The clamping mechanism 108 is able open and closed the mold halves and to apply at least 100-150 tons of clamp force. In the schematic, the mold parting line is oriented horizontally, for example. The operation of clamping mechanism 108 corresponds to steps 10, 14, 20 and 24.

Thermoplastic resin is rendered molten in a heated screw injector 112 and injected at very high pressure in to the mold [step 12] which is closed in the direction of arrow 110. The types of resin include polymethyl(meth)acrylate, polycarbonate, polycarbonate/polyester blends, polyamide, polyester, cyclic olefin copolymers, polyurethane, polysulfone and combinations thereof. Excellent results have been achieved with polycarbonate derivatives.

System controller 100 may be programmed to provide packing pressure and cooling time until clamping mechanism 108 opens the mold [step 14] in the direction of arrow 114. The lens 104a may be retained on either the convex or concave insert. In any event, the lens must be sufficiently solidified to be withdrawn from the other mold insert without deforming. The gated lens-forming cavity is one of an afocal lens forming cavity, a unifocal lens forming cavity, a bifocal lens forming cavity, a trifocal lens forming cavity, and a progressive lens forming cavity.

As an example, the mold consists of a four cavity configuration. But the number of cavities n could be any number the mold block can accommodate, preferably between 1 and 12. A corresponding number (n) of glue dispensers 116a are arranged on reciprocating arm and shuttled in to the open mold via a glue controller 116. A full metered charge of glue is deposited on the center of each lens [step 16]. The glue will be exposed to the ambient atmosphere. The glue may be stored in one or several syringes having a metered delivery system. Alternately, one glue dispenser can deposit glue on to the lenses sequentially. The lenses are very hot, having been at 500-600 degrees F. when injected, and gradually cooling to the mold temperature of 200-300 degrees F.

Preferentially the glue may be a (meth)acrylate based glue, which functions to adhere the film to the lens. Other desirable rheological, chemical and optical properties of the glue include the following. The glue should be solvent free, that is, free of volatile organic compounds (VOCs). The release of VOCs or solvents during evaporation could perturb polymerization or cause bubble contaminations and thus effect the optical quality of the lens. The glue should be cured at a thermoplastic substrate high molding temperature while maintaining its optical clarity without etching the thermoplastic substrate. The glue can flow across the front surface (or the back surface) of the lens before it gels and then completely cure quickly thereafter. The glue according to the present invention is thermally curable, optically clear preferentially, and avoids visible interference fringes.

Several examples of glues in this class, meeting the above-noted requirements are discussed in United States Published Applications 2007-0138667 and 2007-0138665.

One non-limiting embodiment of the glue is as follows:

| | |
|---|---|
| Cobalt naphthenate | 0.25 phm |
| SR506 | 1% |
| BzA (benzyl acrylate) | 19% |
| SR349 | 20% |
| SR399 | 30% |
| CN965 | 30% |
| TAEC | 1.5 phm |

SR506: isobornyl acrylate (monofunctional (meth)acrylate)
BzA: benzyl acrylate (monofunctional (meth)acrylate)
SR349: ethoxylated (3) bisphenol-A-diacrylate (difunctional (meth)acrylate
SR399: dipentaerythritol pentacrylate (multifunctional (meth)acrylate)
CN965: urethane diacrylate (aliphatic urethane diacrylate)
TAEC: tert-butyloxyperbenzoate A general formula for (meth)acrylate glues meeting the requirements of this invention is as follows:

1—at least one monofunctional (meth)acrylate
2—at least one multifunctional (meth)acrylate
3—at least one difunctional (meth)acrylate
4—at least one aliphatic urethane diacrylate
5—at least one metal salt, and
6—at least one initiator.

After the glue is dispensed, a film dispenser, or n film dispensers, are brought in to the open mold. Alternatively, a single layer film may be referred to as a functional film. Film dispenser 118a is configured to pick films off stack 118c and place them on top of the glue drop which is residing on the hot lens [step 18a]. Film dispenser 118b is configured to pick films off stack 118c, articulate 180 degrees, and place them in to the empty cavity within movable mold 106 [step 18b]. A film controller 118 is coupled to system controller 100.

Clamping mechanism 108 then closes the mold along the direction of arrow 120 and exerts a secondary clamp force [step 20]. As the insert approach their initial positions from step 10, the film presses down on the glue dot, causing it to spread out in a thin, even layer across the upwardly facing surface of the hot lens. The amount of glue is carefully determined so that a sufficient amount is provided to spread to the entire periphery of the lens/film, without spilling into the molding machine. The residual heat from the cooling molten plastic, the hot mold, and the reduced clamp force are sufficient to thermoform the film or thin, approximately 1 mm film [step 22]. The clamp holds at the secondary clamp force, until the glue cures, intimately laminating the film across its entire surface area to the lens. System controller directs clamping mechanism 108 to open the mold [step 24] in the direction of arrow 124 at a time when the film is dimensionally and adhesively stable so it will retain its thermoformed shape, and be securely laminated to the lens. The laminated lens can then be safely ejected from the mold, completing the cycle. The empty mold is now ready to close and repeat the cycle beginning again at step 10.

After the film is laminated to one side of the lens, the resulting lens laminate may be provided with a coating. Such coatings may include photochromic coatings, anti-fog coatings, anti-static coatings, anti-scratch coatings, protective coatings, anti-reflective coatings, clear coatings, cosmetically tinted coatings and anti-smudge coatings. The invention further covers thermoplastic ophthalmic lenses, laminated lenses, and functionally enhanced or modified lenses manufactured by the described methods, and as otherwise described herein.

Having described preferred embodiments for lens manufacturing, materials used therein for coatings and methods for processing same (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for laminating a functional film onto an injection molded thermoplastic lens that resides in an injection molding machine having a horizontally oriented parting line, comprising the steps of injecting molten thermoplastic resin into a lens-forming cavity held closed under a primary clamp force;

opening the mold at a time when the lens is rigid enough to retain its shape and separate from an insert;

depositing an unpressurized full metered charge of curable glue onto the center of the horizontally oriented lens;

introducing a functional film between the glue and the separated insert; and closing the mold to a secondary clamp force less than or equal to the primary clamp force to thinly spread the glue between the film and lens so that it cures with the heat transferred from the mold and the diminishing residual heat of the lens whereby an optically clear laminated ophthalmic lens is formed that avoids visible interference fringes.

2. The method of claim 1, wherein the thermoplastic resin is injected at a melt temperature $T_m$ that is significantly above its glass transition $T_g$ temperature, and the lens forming cavity is at a temperature lower than $T_g$ to facilitate solidification.

3. The method of claim 2, wherein the $T_m$ is in the range of 500 degrees F. to 600 degrees F. and the mold temperature is in the range of 200 degrees F. to 295 degrees F. when the lens forming resin is polycarbonate.

4. The method of claim 1, wherein the curable glue comprises an acrylate-based adhesive which is curable at a temperature between $T_m$ and the mold temperature.

5. The method of claim 4, wherein said depositing step comprises applying a liquid glue in an open-air state; and wherein during the closing step the glue is spread in the absence back pressure.

6. The method of claim 4, wherein the curable glue is VOC-free, and compatible with the lens resin and film material.

7. The method of claim 6, wherein the curable glue provides an adhesive layer to optically bond an outer film surface to an outer lens surface at a temperature well below the $T_m$ of the injecting thermoplastic resin.

8. The method according to claim 4, wherein the glue includes one or more (meth)acrylate compounds, an initiator, and a metal salt.

9. The method according to claim 6, wherein the glue includes a monofunctional (meth)acrylate compound, a multifunctional (meth)acrylate compound, a difunctional (meth)acrylate compound, and an aliphatic urethane diacrylate.

10. The method according to claim 8, wherein the metal salt is Cobalt naphthenate, and the initiator is tert-butylperoxybenzoate.

11. The method of claim 6, further comprising an additional material blended into the curable glue, wherein the additional material is selected from the group consisting of a photochromic dye, a thermoplastic polyurethane (TPU) and combinations thereof.

12. The method of claim 1, wherein said closing step includes thermoforming the film to replicate the shape of the lens and any surface textures on the insert.

13. The method of claim 1, wherein the functional film is selected from the group consisting of a sandwiched polarizing filter, a photochromic film, and an anti-reflective film.

14. The method of claim 1, wherein the functional film comprises a polarizing filter of polyvinyl acetate (PVA) sandwiched between a protective layer made from a material selected from the group consisting of polycarbonate, cellulose triacetate (TAC), cellulose acetate butyrate (CAB), and polyethylene terephthalate (PET).

15. The method of claim 14, wherein the protective layer includes a functional feature.

16. The method of claim 1, wherein the secondary clamp force is in the range from about 1% to about 100% of the primary clamp force.

17. The method of claim 16, wherein the secondary clamp force is less than the primary clamp force.

18. The method of claim 1, wherein following said closing step, the method further including the step of:
ejecting the lens from the mold after the adhesive has cured and the laminated lens is capable of withstanding ejection forces without deforming.

19. The method of claim 1, wherein the thermoplastic resin is selected from polymethyl(meth)acrylate, polycarbonate, polycarbonate/polyester blends, polyamide, polyester, cyclic olefin copolymers, polyurethane, polysulfone and combinations thereof.

20. The method of claim 19, wherein the thermoplastic resin is polycarbonate.

21. The method of claim 1, wherein the lens-forming cavity is selected from an afocal lens forming cavity, a unifocal lens forming cavity, a bifocal lens forming cavity, a trifocal lens forming cavity, and a progressive lens forming cavity.

* * * * *

UNITED STATES PATENT AND TRADEMARK OFFICE
CERTIFICATE OF CORRECTION

PATENT NO. : 7,820,081 B2
APPLICATION NO. : 12/120628
DATED : October 26, 2010
INVENTOR(S) : Hao-Wen Chiu and Matthew James Lockwood It is certified that error appears in the above-identified patent and that said Letters Patent is hereby corrected as shown below:

Cover page, item (73), line 2, delete "Paris" and insert --Charenton--; and

Column 4, line 47, after "is" delete "mat" and insert --that--.

Signed and Sealed this
Thirty-first Day of May, 2011

David J. Kappos
*Director of the United States Patent and Trademark Office*